(12) United States Patent
Mauelshagen et al.

(10) Patent No.: US 6,808,575 B2
(45) Date of Patent: Oct. 26, 2004

(54) PROCEDURE FOR THE MANUFACTURE OF AN ALL PLASTIC OIL PAN WITH INTEGRATED OIL FILTER

(75) Inventors: Michael Mauelshagen, Reichshof-Denklingen (DE); Markus Beer, Morsbach (DE)

(73) Assignee: IBS Filtran Kunststoff/Metallerzeugnisse GmbH (DE)

( * ) Notice: Subject to any disclaimer, the term of this patent is extended or adjusted under 35 U.S.C. 154(b) by 0 days.

(21) Appl. No.: 10/673,462

(22) Filed: Sep. 30, 2003

(65) Prior Publication Data

US 2004/0129368 A1 Jul. 8, 2004

(30) Foreign Application Priority Data

Oct. 12, 2002 (EP) .............................................. 02022815

(51) Int. Cl.[7] .............................................. B29C 65/08
(52) U.S. Cl. ..................... 156/73.5; 156/292; 156/308.2
(58) Field of Search ........................ 156/69, 73.5, 73.6, 156/292, 308.2, 580, 580.2

(56) References Cited

U.S. PATENT DOCUMENTS 6,503,352 B2 * 1/2003 Nakajima et al. .......... 156/73.5
6,663,933 B2 * 12/2003 Nakajima et al. ............. 428/60

* cited by examiner

Primary Examiner—James Sells
(74) Attorney, Agent, or Firm—Baker & Hostetler LLP

(57) ABSTRACT

To manufacture a plastic oil pan having an integrated oil filter, a first filter component is assembled. This first filter component includes a filter medium and an oil pan integrated surface section. In addition, the first filter component is placed into a first tool, a second component is placed in a second tool, and the second tool is closed on to the first tool so that a first flange of the first filter component is pressed unto a second flange of the second filter component. Furthermore, the first flange is vibration welded to the second flange. In this manner, the second filter component is fixed upon the oil pan integrated surface section to create a hermetic seal between the second filter component and the oil pan integrated surface section. Moreover, the second tool is separated from the first tool and the oil pan having the integrated oil filter is removed.

19 Claims, 2 Drawing Sheets

PROCEDURE FOR THE MANUFACTURE OF AN ALL PLASTIC OIL PAN WITH INTEGRATED OIL FILTER

CROSS REFERENCE TO RELATED APPLICATIONS

This application claims priority to European Patent Application Serial No. EP 02 022 815, filed Oct. 12, 2002, titled PROCEDURE FOR THE MANUFACTURE OF AN ALL PLASTIC OIL PAN WITH INTEGRATED OIL FILTER, the disclosure of which is incorporated herein by reference in its entirety.

FIELD OF THE INVENTION

Object of the invention is a procedure for the manufacture of an all plastic oil pan with integrated oil filter for engine and transmission applications.

BACKGROUND OF THE INVENTION

In accordance with the current state of technology, oil filtration in an engine or automatic transmission takes place through a separate oil filter located outside of the oil pan. For this, oil filters, oil pan gaskets and oil pans are used as separate components. The layout of the oil filter is generally in a manner so that the oil filter is easily accessible and can be easily exchanged during maintenance. This is generally achieved by placing the oil filter outside the surface level of the engine. The size of the oil filter is limited so that the requirement for space can be minimized, which results in a small filter surface which has to be frequency replaced.

To avoid this disadvantage, newer state of technology describes oil filters that are integrated into the oil pan. Regarding this, there are designs that either have the oil filter as a separate plastic component in the oil pan, as well as designs by which a filter component is formed in an area at the bottom of the oil pan. These types of oil pans are for example described in pamphlets DE 197 35 445 A1 and DE 100 08 692 A1 of the registrant.

The manufacture of oil pans with integrated oil filters occurs in accordance with the state of technology that typically uses welding, whereby vibration welding is frequently used. Other laser welding methods are also known to have, however, not yet been successfully implemented in everyday applications.

This type of laser welding for example is described in EP 0 995 535 A2. Regarding this, one filter component consists of plastic material that can be penetrated by a laser beam. The laser beam is run along the laser penetrable plastic material at the point of contact with the other filter component. Through the light absorption by the laser penetrable plastic material heat is generated which results in the joining of both components through this melting process.

The separate plastic components of the oil filter are usually joined through vibration or laser welding. In these procedures the upper filter component is welded to the lower component. The current state of technology includes several types of vibration welding procedures.

U.S. Pat. No. 5,853,577 describes a filter for liquids that consists of an upper and a lower plastic component, whereby these parts are joined through vibration welding. The oil filter is used in engines and transmissions.

U.S. Pat. No. 5,049,274 describes a procedure for the manufacture of an oil filter consisting of an upper and lower component made from plastic. In this procedure the filter material is clamped between an upper and a lower component, and afterwards the upper and lower covers are joined through a vibration welding procedure. The upper filter component includes a pump connection tube. The preferred procedure is linear vibration welding.

The submitted invention pertains to an improvement in the vibration welding procedure of the oil pan with integrated oil filter.

It is a given that during the manufacture of oil filters utmost cleanliness and precision must be used. The oil filter generally has a pump connection tube that extends beyond the surface of the filter component. The assembly to the engine or the transmission is usually performed by installing the oil pan with the integrated filter below the motor or transmission block, whereby the pump tube that extends beyond the filter surface is connected to the engine or transmission block. Afterwards the entire oil pan is assembled to the motor or transmission block by means of the appropriate bushings that are included in the flange of the oil pan.

It is therefore important that the oil pans are manufactured very precisely with tolerance variations held to a minimum during the manufacturing process so that a tension free assembly to the engine or the transmission block is possible. Additionally, deformation, bowing or pressure loading of the plastic components in the assembled state can result in leakage in the welding area which leads to oil leads and in the worst cast to complete filter failure.

Vibration welding is a procedure whereby the components to be welded move against each other. The range of this movement varies depending on the type of vibration welding used. Welding methods that are generally known include, for example, linear welding, orbital welding, circular welding, or ultrasonic welding. A common element of all of these procedures is that the parts to be welded move against each other in defined directions through energy that is created. The resulting warmth results in the melting of the joining flanges so that after cooling the parts are welded together. Since the parts move against each other during the welding process the position of the welded parts after completion of the welding process is not consistent. The variation is in a certain tolerance range depending on the particular vibration welding movements.

Results have shown that parts welded with vibration welding procedures require higher tolerances than parts that are manufactured with a welding process where there is no movement of the parts against each other.

For the perfect function of the engine or the motor it is necessary that the assembly of the oil pan to the engine or transmission block and the assembly of the filter component to the oil pan is so durable that oil leaks and air leakage are avoided. For this it is important to state that the temperature ranges the oil pan is subjected to are considerable and can range from −40° C. to 160° C., depending on the various geographical regions where the motor or the transmission is used. Added to this is the mechanical load of the oil pan, for example through external occurrences, i.e., stone impact, potholes, etc. The same is true for the oil filter that is integrated into the oil pan that also needs to be sealed tightly to provide problem free function.

The technical assignment for the invention is to modify the vibration welding procedure for the oil pan with integrated filter in a manner so that the finished part has minimum tolerance variability to provide stress free assembly of the part to the engine or transmission block.

SUMMARY OF THE INVENTION

The foregoing needs are met, to a great extent, by the present invention, wherein in one respect a method is provided that in some embodiments is utilized to produce an oil pan with integrated filter.

An embodiment of the present invention pertains to a method for manufacturing a plastic oil pan having an integrated oil filter. In this method, a first filter component is assembled. This first filter component includes a filter medium and an oil pan integrated surface section. In addition, the first filter component is placed into a first tool, a second component is placed in a second tool, and the second tool is closed on to the first tool so that a first flange of the first filter component is pressed unto a second flange of the second filter component. Furthermore, the first flange is vibration welded to the second flange. In this manner, the second filter component is fixed upon the oil pan integrated surface section to create a hermetic seal between the second filter component and the oil pan integrated surface section. Moreover, the second tool is separated from the first tool and the oil pan having the integrated oil filter is removed.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

Figure 1:
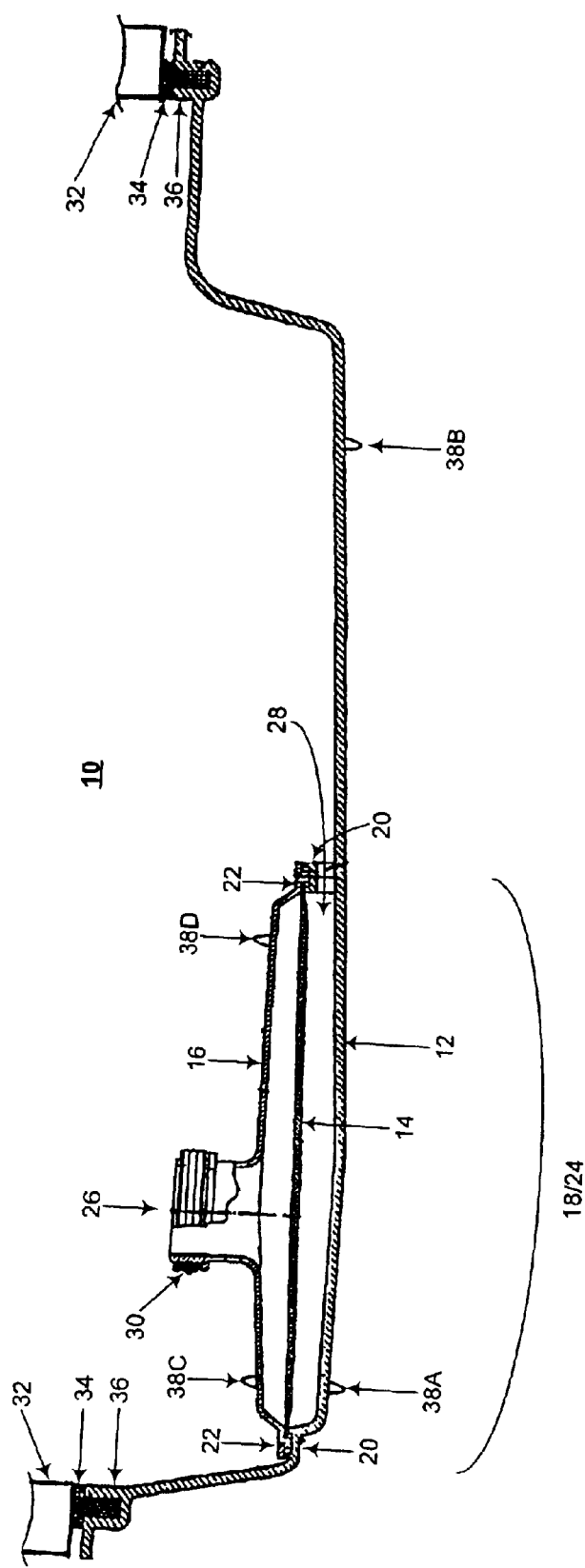
FIG. 1 is an illustration of an oil pan with integrated filter assembly according to an embodiment of the invention.

Preferred embodiments of the invention will now be described with reference to the drawing figures, in which like reference numerals refer to like parts throughout. As shown in FIG. 1 an oil pan with integrated filter assembly (oil pan) 10 includes a base 12, a filter medium 14, and a filter housing 16. The base 12 includes an oil pan integrated surface section 18 and a pan flange 20. The filter medium 14 is disposed between the base 12 and the filter housing 16. The filter housing 16 includes a housing flange 22 configured to mate with the pan flange 20. As disclosed herein, the pan flange 20 and the housing flange 22 are secured one to the other by a process of vibration welding. In this manner, an oil filter 24 is formed that is integral to the oil pan 10.

The oil filter 24 filters oil through the filter medium 14 as oil travels between a pump inlet/outlet 26 and a filter inlet/outlet 28. That is, according to various embodiments of the invention, the pump inlet/outlet 26 is operably attached to a pump configured to draw oil in or push fluid out. Thus, depending upon the conformation of the pump, the pump inlet/outlet 26 serves as either an inlet or an outlet and correspondingly, the filter inlet/outlet 28 serves as either an outlet or an inlet, respectively. The pump inlet/outlet 26 includes an O-ring assembly 30 to form a substantially oil-impermeable seal between the pump inlet/outlet 26 and the pump. The filter inlet/outlet 28 is located such that oil must pass through the filter medium 14 as the oil travels from between the filter inlet/outlet 28 and the pump inlet/outlet 26. For example, as shown in FIG. 1, the filter inlet/outlet 28 is an opening or series of openings formed within the pan flange 20.

To substantially seal the oil pan 10 to a motor/transmission 32, the oil pan 10 includes an oil pan gasket 34 that is disposed within a gasket groove 36.

To facilitate the process of constructing the oil pan 10, the base 12 and the filter housing 16 include a plurality of engagement points 38a to 38d. For example, as shown in FIG. 1, the base 12 includes the engagement points 38a and 38b and the filter housing 16 includes the engagement points 38c and 38d. However, while 4 engagement points are shown in FIG. 1, the invention is not limited to 4 engagement points, but rather, any reasonable number of engagement points such as 4, 5, 6 or more engagement points may be included. An advantage of these engagement points 38a to 38d, is that during assembly of the oil pan 10, the various components of the oil pan 10 are more accurately positioned as compared to conventional oil pan assembly methods. That is, the engagement points 38a to 38d are configured to mate with a plurality of respective positioning aids such as for example, holes, dimples, depressions, and the like. These positioning aids are accurately formed into tools configured to hold the components of the oil pan 10 during the vibration welding process.

In another embodiment, the positioning aids within one or more of the tools are in the form of posts or other such protrusion. Accordingly, in this embodiment, the corresponding engagement points 38a to 38d are configured as mating depressions.

Figure 2:
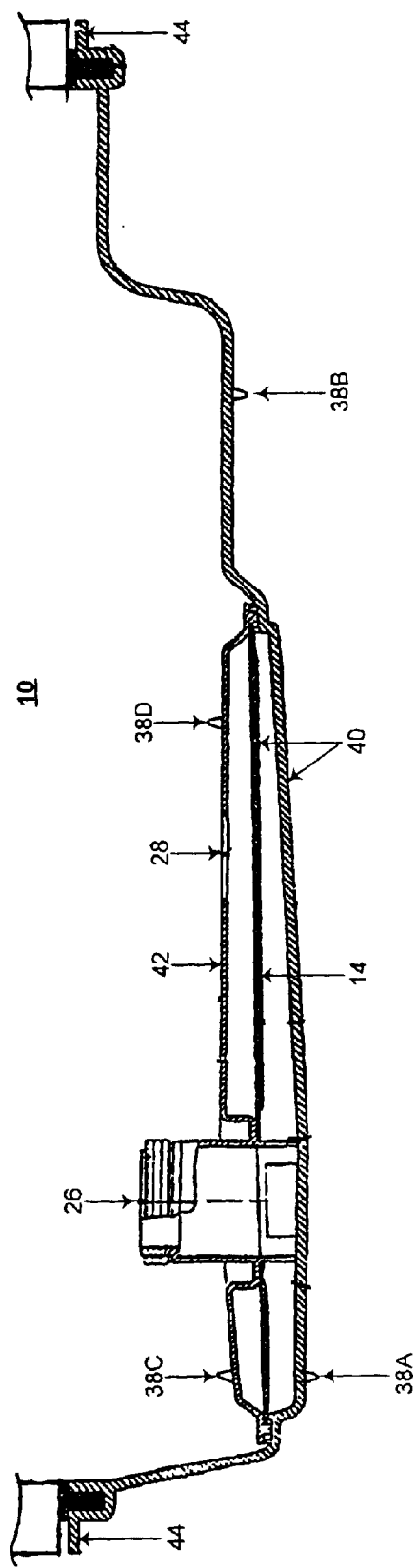
FIG. 2 is an illustration of an oil pan with integrated filter assembly according to another embodiment of the invention.

FIG. 2 is an illustration of the oil pan 10 according to another embodiment of the invention. The oil pan 10 shown in FIG. 2 is similar to the oil pan 10 shown in FIG. 1 and thus, for the purpose of brevity, those items described in FIG. 1 will not be described again in FIG. 2. As shown in FIG. 2, during the process of vibration welding the various components of the oil pan 10, a first filter component 40 includes the base 12 and the filter medium 14. Additionally, a second filter component 42 includes the filter housing 16. A difference between the oil pan 10 of the embodiment shown in FIG. 2 as compared to the oil pan 10 of the embodiment shown in FIG. 1 is that the filter inlet/outlet 28 is disposed in a different location. More particularly, the filter inlet/outlet 28 is disposed in the second filter component 42. However, in a manner similar to that shown in FIG. 1, the filter inlet/outlet 28 is located such that oil must pass through the filter medium 14 as the oil travels from between the filter inlet/outlet 28 and the pump inlet/outlet 26.

To facilitate attachment of the oil pan 10 to the motor/transmission 32, the base 12 includes an outer flange 44. This outer flange 44 serves as a bearing surface upon which any suitable fastening device is utilized to attach the pan 10 to the motor/transmission 32. Examples of suitable fastening devices include, for example, bolts, clips, and the like.

An advantage of this invention procedure lies in the fact that by controlling the position of the first filter component 40 during the vibration welding procedure the result is that the position of the second filter component 42 relative to the position of the first filter component 40 remains constant at the completion of the vibration welding procedure. Through this, a higher accuracy of fit of the oil pan 10 during the assembly to the motor or transmission block 32 can be achieved. In addition, tensions during the assembly will be avoided which can be the case with parts that have higher tolerances that also can negatively affect the function of the oil pan 10 regarding sealing and durability.

The positioning over a minimum of the two engagement points 38a and 38b that are placed on the outer side of the first filter component 40 or the two engagement points 38c and 38d that are placed on the outer side of the second filter component 42 is done through a special procedure. The appropriate positioning aids are placed in at least one of the tool components during the vibration welding procedure. These positioning aids grip the engaging points 38a to 38d during the welding procedure in such a manner that at the end of the vibration welding procedure the first filter component 40 and the second filter component 42 are positioned to each other in previously defined locations. The engaging points 38c and 38d are placed in a special procedure on the outer side of the second filter component 42. The engaging points 38a to 38d preferably are studs that are located in one of the tool components.

For the manufacture of the all-plastic oil pan 10, the base 12 is placed first in a lower tool, and the second filter component 42 with the pump inlet tube is placed in the upper tool. The engaging points 38c and 38d are preferably located in the upper tool. These are studs that grip the engaging points 38c and 38d that are located on the outer side of the filter component.

The oil pan 10 and/or various components of the oil pan 10 are held in the tool components through vacuum suction prior to the closing of the tool. A vacuum of >700 mbar is used. This method insures that the pan flange 20 and the housing flange 22 are in line. Detailed measurements have shown that in conventional vibration welding, the flanges are often slightly warped which has a negative impact on the welding and can lead to uneven welding resulting in leaks. It is an advantage of the present invention that improved placement of first filter component 40 and the second filter component 42 substantially reduces warping of the flanges.

The filter medium 14 is placed in the oil pan integrated surface section 18 prior to the placement of the base 12 into the lower tool. Prior to the closing of the tool the position of the filter medium 14 in the oil pan integrated surface section 18 is tested with the appropriate measuring device, preferably a camera with the appropriate measuring program that checks the position of the filter medium 14 in the oil pan integrated surface section 18. The purpose of this test is to insure that the filter medium 14 is placed correctly in the oil pan integrated surface section 18.

The welding is done with linear welding, circular welding, or orbital welding, whereby the linear welding is preferred. The procedure parameter of the welding procedure is as follows: adaptation pressure 50 to 90 bar, preferably 70 to 80 bar; vibration frequency 100 to 300 Hz, preferably 240 Hz; and welding time 1 to 10 sec., preferably 4 to 6 sec.

Additionally it is preferred that prior to placing the second filter component 42 into the tool component, the pump inlet/outlet 26 located on the outside of the second filter component 42 is covered with the appropriate covering aid. Especially preferred is that an O-ring is assembled on the pump inlet/outlet 26 and its opening covered with a plug. This will insure that during the welding process or additional assembly of the oil pan 10, no contaminants, dust particles or flash can reach the inside of the oil pan 10 through the pump inlet/outlet 26. This type of contamination can endanger the function of the filter medium 14 and the pump considerably and also endanger the durability considerably.

The oil pan 10 and its outer flange 44 include holes that are used to fasten the oil pan 10 to the motor or transmission block 32. Since the outer flange 44 is made from plastic, the appropriate metal bushings must be inserted so that torque can be transferred during the assembly with appropriate fastening aides, i.e., bolts.

This bushing assembly is done after the welded oil pan 10 is removed from the tool. Preferably, prior to the bushing assembly, the holes are held by positioning posts that direct the bushing assembly heads and assemble the bushings into the holes in the outer flange 44 of the oil pan 10. The bushing assembly tool preferably is equipped with three bushing assembly heads that can assemble from one up to three bushings at the same time.

It is preferred that the bushing assembly is done using two bushing assembly heads, whereby one head is fixed and the other head is moveable. In this manner the tolerance fluctuations between the holes in the oil pan outer flange 44 can be accommodated for and balanced. This is preferred additionally since the delivery of the bushings to their final assembly point is done mechanically by means of the flexible tube into the bushing assembly heads. The bushings are stacked in ascending order to a dropping point. By means of gravity they will fall at the dropping point into the appropriate delivery tool into the bushing assembly heads. This method avoids the use of air pressure. The use of air pressure often results in pulling contaminants along into the bushing assembly head during the bushing delivery and as a result also into the oil pan 10 and the oil filter medium 14. With the method described a relatively contaminant free work environment during the manufacture is insured that will increase longevity and long lasting sealing of the oil pan 10.

The bushing assembly is followed by the assembly of the oil pan gasket 34 which is pressed into the gasket groove 36 in the outer flange 44 of the oil pan 10. Additionally, magnets are assembled to the inside of the oil pan 10. These magnets aid in the removal of magnetic metal particles from the oil that circulates in the oil pan 10. In an additional assembly step the oil drainage plug is assembled in the oil pan 10, as well as the leak testing of the oil filter 24 and the entire oil pan 10 under pressure.

Next the leak testing of the oil filter 24 is completed under pressure. This test is used to check on possible cracks in the assembly between the base 12, the filter housing 16, and the filter medium 14 or if the parts are not fully molded. In addition, it checks to confirm that the O-ring is assembled to the pump inlet tube and that it is airtight.

The oil drainage plug is assembled using a defined torque and a previously determined rotation angle. After this the leak testing of the entire oil pan 10 is completed under pressure. Here the testing checks if the oil pan gasket 34 is functional, if there are cracks or if there is damage to the oil pan 10 or if areas of the oil pan 10 are not fully molded. In addition the oil drainage plug is air leak tested and if the magnets are assembled and if they are magnetized.

In an additional step a differential pressure test is performed on the oil drainage plug with overpressure to confirm that the oil drainage plug is airtight.

With this invention procedure all-plastic oil pans with integrated oil filter of the highest quality can be manufactured. Through this procedure tolerances on the manufactured parts are considerably minimized over parts that are manufactured in accordance with the current state of technology. In addition, tension free assembly to the motor or transmission block is insured. The invention procedure is additionally modified in comparison to the current state of technology so that the introduction of contaminants during the manufacturing process into the oil filter is avoided. As a result, this insures the function and long life of the oil pan and integrated filter.

What is claimed is:

1. A method of manufacturing a plastic oil pan having an integrated oil filter, the method comprising:

assembling a first filter component comprising a filter medium and an oil pan integrated surface section;

placing the first filter component into a first tool;

placing a second filter component in a second tool;

closing the second tool on to the first tool so that a first flange of the first filter component is pressed unto a second flange of the second filter component;

vibration welding the first flange to the second flange, whereby the second filter component is fixed upon the oil pan integrated surface section in a manner to create a hermetic seal between the second filter component and the oil pan integrated surface section; and separating the second tool from the first tool and removing the plastic oil pan.

2. The method in accordance with claim 1, further comprising:

identifying that the first filter component and the second filter component are disposed such that at the completion of the vibration welding process the first filter component and the second filter component are assembled in a previously defined position.

3. The method in accordance with claim 2, further comprising:

identifying the relative position of the first filter component and the second filter component by positioning a plurality of engaging points.

4. The method in accordance with claim 3, wherein the plurality of engaging points are placed on an outer side of the first filter component.

5. The method in accordance with claim 3, wherein the plurality of engaging points are placed on an outer side of the second filter component.

6. The method in accordance with claim 3, further comprising:

identifying the relative position of the first filter component and the second filter component by mating the plurality of engaging points with a plurality of respective positioning aids.

7. The method in accordance with claim 6, wherein the plurality of positioning aids comprise a plurality of studs that are located in the first tool.

8. The method in accordance with claim 6, wherein the plurality of positioning aids comprise a plurality of studs that are located in the second tool.

9. The method in accordance with claim 1, further comprising:

verifying a position of the filter medium in the oil pan integrated surface section prior to closing the second tool on to the first tool.

10. The method in accordance with claim 1, further comprising:

holding the first filter component in position by vacuum suction prior to the closing the second tool on to the first tool.

11. The method in accordance with claim 1, further comprising:

holding the second filter component in position by vacuum suction prior to the closing the second tool on to the first tool.

12. The method in accordance with claim 1, further comprising:

closing a pump inlet of the second filter component with a plug prior to the placement of the second filter component in the second tool.

13. The method in accordance with claim 1, wherein the vibration welding is performed in a linear manner.

14. The method in accordance with claim 1, wherein the vibration welding is performed in a circular manner.

15. The method in accordance with claim 1, wherein the vibration welding is performed in an orbital manner.

16. The method in accordance with claim 1, further comprising:

inserting a metal bushings into a hole of an outer flange of the plastic oil pan.

17. The method in accordance with claim 16, wherein the insertion of the metal bushing is performed mechanically by means of a flexible tube into which a plurality of metal bushings are stacked in ascending order and by means of gravity will drop into a bushing assembly fixture at a dropping point.

18. The method in accordance with claim 17, wherein a plurality of metal bushings are essentially simultaneously inserted into a plurality of corresponding holes in the outer flange of the plastic oil pan.

19. The method in accordance with claim 18, further comprising:

grasping at least one hole of the holes with a positioning stud that positions the bushing assembly fixture relative to the holes.

* * * * *